United States Patent
Burges et al.

(10) Patent No.: US 7,082,394 B2
(45) Date of Patent: Jul. 25, 2006

(54) NOISE-ROBUST FEATURE EXTRACTION USING MULTI-LAYER PRINCIPAL COMPONENT ANALYSIS

(75) Inventors: Chris Burges, Bellevue, WA (US); John Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 10/180,271

(22) Filed: Jun. 25, 2002

(65) Prior Publication Data

US 2003/0236661 A1    Dec. 25, 2003

(51) Int. Cl.
  G10L 15/02    (2006.01)
  G06K 9/46    (2006.01)

(52) U.S. Cl. .................. 704/243; 704/205; 704/228; 704/235; 382/190

(58) Field of Classification Search ................ 704/205, 704/228, 235, 243; 382/190
See application file for complete search history.

(56) References Cited

U.S. PATENT DOCUMENTS

| | | | |
|---|---|---|---|
| 4,069,393 A * | 1/1978 | Martin et al. ................ | 704/255 |
| 4,843,562 A | 6/1989 | Kenyon et al. | |
| 5,210,820 A | 5/1993 | Kenyon | |
| 5,377,305 A * | 12/1994 | Russo .......................... | 706/25 |
| 5,754,681 A * | 5/1998 | Watanabe et al. ........... | 382/159 |
| 6,061,680 A | 5/2000 | Scherf et al. | |
| 6,154,773 A | 11/2000 | Roberts et al. | |
| 6,230,207 B1 | 5/2001 | Roberts et al. | |
| 6,751,354 B1 * | 6/2004 | Foote et al. ................. | 382/224 |
| 6,947,892 B1 * | 9/2005 | Bauer et al. ................. | 704/233 |
| 2003/0028796 A1 | 2/2003 | Roberts et al. | |
| 2003/0086341 A1 | 5/2003 | Wells et al. | |
| 2003/0095660 A1 | 5/2003 | Lee et al. | |
| 2003/0236661 A1 | 12/2003 | Burges et al. | |
| 2004/0260727 A1 | 12/2004 | Goldstein et al. | |

OTHER PUBLICATIONS

Balachander et al. Oriented Soft Localized Subspace Classification, IEEE ICASSP 1999.*
Jonathan Foote. "*Content-based retrieval of music and audio.*" In Multimedia Storage and Archiving Systems II, Proceedings of SPIE, pp. 138-147, 1997.
Lie Lu, Hao Jiang, and HongJiang Zhang. "*A robust audio classification and segmentation method.*" Technical report, Microsoft Research, 2001.

(Continued)

*Primary Examiner*—Tālivaldis Ivars Šmits
*Assistant Examiner*—Leonard Saint-Cyr
(74) *Attorney, Agent, or Firm*—Lyon & Harr, LLP; Mark A. Watson

(57) ABSTRACT

Extracting features from signals for use in classification, retrieval, or identification of data represented by those signals uses a "Distortion Discriminant Analysis" (DDA) of a set of training signals to define parameters of a signal feature extractor. The signal feature extractor takes signals having one or more dimensions with a temporal or spatial structure, applies an oriented principal component analysis (OPCA) to limited regions of the signal, aggregates the output of multiple OPCAs that are spatially or temporally adjacent, and applies OPCA to the aggregate. The steps of aggregating adjacent OPCA outputs and applying OPCA to the aggregated values are performed one or more times for extracting low-dimensional noise-robust features from signals, including audio signals, images, video data, or any other time or frequency domain signal. Such extracted features are useful for many tasks, including automatic authentication or identification of particular signals, or particular elements within such signals.

42 Claims, 5 Drawing Sheets

OTHER PUBLICATIONS

H.S. Malvar. "*A modulated complex lapped transform and its applications to audio processing.*" In Proc. IEEE Int. Conf. on Acoustics, Speech, and Signal Processing, Pheonix, 1999.

Tong Zhang and C.-C. Jay Kuo. "*Hierarchical classification of audio data for archiving and retrieving.*" In IEEE International Conference on Acoustics, Speech, and Signal Processing, Phoenix, 1999.

Narendranath Malayath, Hynek Hermansky, and Alex Kain. "*Towards Decomposing the Sources of Variability in Speech.*" Proceedings of Eurospeech'97, Rhodes, Greece 1997.

H. Hermansky and N. Malaynath, "*Speaker verification using speaker-specific mapping.*" Speaker Recognition and its Commercial and Forensic Applications, France, May 1998.

\* cited by examiner

NOISE-ROBUST FEATURE EXTRACTION USING MULTI-LAYER PRINCIPAL COMPONENT ANALYSIS

BACKGROUND

1. Technical Field

The invention is related to a signal feature extractor, and in particular, to a system and method for using a "distortion discriminant analysis" of a set of training signals to define parameters of a feature extractor for extracting distortion-robust features from signals having one or more dimensions, such as audio signals, images, or video data.

2. Related Art

There are many existing schemes for extracting features from signals having one or more dimensions, such as audio signals, images, or video data. For example, with respect to a one-dimensional signal such as an audio signal or audio file, audio feature extraction has been used as a necessary step for classification, retrieval, and identification tasks involving the audio signal. For identification, the extracted features are compared to a portion of an audio signal for identifying either elements within the audio signal, or the entire audio signal. Such identification schemes are conventionally known as "audio fingerprinting."

Conventional schemes for producing features for pattern matching in signals having one or more dimensions typically approach the problem of feature design by handcrafting features that it is hoped will be well-suited for a particular identification task. For example, current audio classification, segmentation and retrieval methods use heuristic features such as the mel cepstra, the zero crossing rate, energy measures, spectral component measures, and derivatives of these quantities. Clearly, other signal types make use of other heuristic features that are specific to the particular type of signal being analyzed.

For example, one conventional audio classification scheme provides a hierarchical scheme for audio classification and retrieval based on audio content analysis. The scheme consists of three stages. The first stage is called a coarse-level audio segmentation and classification, where audio recordings are segmented and classified into speech, music, several types of environmental sounds, and silence, based on morphological and statistical analysis of temporal curves of short-time features of audio signals. In the second stage, environmental sounds are further classified into finer classes such as applause, rain, birds' sound, etc. This fine-level classification is based on time-frequency analysis of audio signals and use of the hidden Markov model (HMM) for classification. In the third stage, the query-by-example audio retrieval is implemented where similar sounds can be found according to an input sample audio.

Another conventional scheme approaches audio content analysis in the context of video structure parsing. This scheme involves a two-stage audio segmentation and classification scheme that segments and classifies an audio stream into speech, music, environmental sounds, and silence. These basic classes are the basic data set for video structure extraction. A two-stage algorithm is then used to identify and extract audio features. In particular, the first stage of the classification is to separate speech from non-speech, based on simple features such as high zero-crossing rate ratio, low short-time energy ratio, spectrum flux and Linear Spectral Pairs (LSP) distance. The second stage of the classification further segments non-speech class into music, environmental sounds and silence with a rule based classification scheme.

Still another conventional scheme provides an audio search engine that can retrieve sound files from a large corpus based on similarity to a query sound. With this scheme, sounds are characterized by "templates" derived from a tree-based vector quantizer trained to maximize mutual information (MMI). Audio similarity is measured by simply comparing templates. The basic operation of the retrieval system involves first accumulating and parameterizing a suitable corpus of audio examples into feature vectors. The corpus must contain examples of the kinds (classes) of audio to be discriminated between, e.g., speech and music, or male and female talkers. Next, a tree-based quantizer is constructed using a manually "supervised" operation which requires the training data to be labeled, i.e., each training example must be associated with a class. The tree automatically partitions the feature space into regions ("cells") which have maximally different class populations. To generate an audio template for subsequent retrieval, parameterized data is quantized using the tree. To retrieve audio by similarity, a template is constructed for the query audio. Comparing the query template with corpus templates yields a similarity measure for each audio file in the corpus. These similarity measures can then be sorted by similarity and the results presented as a ranked list.

Another approach to feature extraction has been applied in the area of speech recognition and speech processing. For example, one conventional scheme provides a method for decomposing a conventional LPC-cepstrum feature space into subspaces which carry information about linguistic and speaker variability. In particular, this scheme uses oriented principal component analysis (OPCA) to estimate a subspace which is relatively speaker independent.

A related OPCA technique builds on the previous scheme by using OPCA for generating speaker identification or verification models using speaker information carried in the speech signal. This scheme is based on a three step modeling approach. In particular, this scheme first extracts a number of speaker-independent feature vectors which include linguistic information from a target speaker. Next, a set of speaker-dependent feature vectors which include both linguistic and speaker information are extracted from the target speaker. Finally, a functional mapping between the speaker-independent and the speaker-dependent features is computed for transforming the speaker-independent features into speaker-dependent features to be used for speaker identification.

However, while the aforementioned schemes are useful, they do have limitations. For example, a feature extractor system designed with heuristic features such as those discussed above is not typically optimal across multiple types of distortion or noise in a signal. In fact, different features than those selected or extracted often give better performance, or are more robust to particular types of noise or distortion. Further, with respect to the OPCA based schemes, these schemes do not effectively address noise or distortions in the signal being analyzed over wide temporal or spatial windows.

Therefore, what is needed is a system and method for extracting features from a set of representative training data such that the features extracted will be robust to both distortion and noise when used for feature classification, retrieval, or identification tasks involving an input signal.

SUMMARY

A system and method for extracting features from signals having one or more dimensions for use in classification, retrieval, or identification of the data represented by those signals uses a "Distortion Discriminant Analysis" (DDA) of a set of training signals to define parameters of a signal feature extractor. Note that in the context of this description, a "signal" is defined to be any set of data that has a low-dimensional index set. In general, the signal feature extractor is capable of extracting features from any time, space, or frequency domain signal of one or more dimensions. For example, such signals include an audio signal which is considered to be a one-dimensional signal; an image is which considered to be a two-dimensional signal; and video data which is considered to be a three-dimensional signal. Thus, the term signal, as used throughout this description will be understood to mean a signal of any dimensionality, except where particular signal types are explicitly referred to.

The signal feature extractor described herein takes any signal with a temporal or spatial structure, applies an oriented principal component analysis (OPCA) to limited regions of the signal, aggregates the output of multiple OPCAs that are spatially or temporally adjacent, and then applies OPCA to the aggregate. The steps of aggregating adjacent OPCA outputs and applying OPCA to the aggregated values can be performed one or more times. Consequently, the use of two or more OPCA layers allows for the extraction of low-dimensional noise-robust features from a signal, such as, for example, audio signals, images, video data, or any other time, space, or frequency domain signal. Such extracted features are useful for many tasks, including, for example, automatic authentication or identification of particular signals, or particular elements within such signals. For example, with respect to an audio signal, the DDA system described herein is capable of identifying particular songs or audio clips, either individually, or as a part of a continuous or semi-continuous audio stream. Other examples using audio data include, for example, speaker identification or differentiation, speech recognition, etc.

"Distortion Discriminant Analysis," (DDA), is a novel concept which addresses several primary concerns, as detailed below. In general, DDA can be viewed as a multilayer linear convolutional neural network, where the weights are trained using a modified Oriented Principal Components Analysis (OPCA) rather than by other well-known techniques such as back-propagation. Each DDA layer applies OPCA to maximize a signal-to-noise ratio of its output, with a corresponding dimensional reduction of the input. Two or more DDA layers are aggregated in order to enforce shift invariance, to reduce computation time, and to build in robustness to noise and distortion at different temporal or spatial scales. Note that in an alternate embodiment, the DDA system and method described herein operates to construct a non-linear convolutional neural network rather than a linear convolutional neural network.

Further, while the DDA system and method is described herein with respect to extraction of features from audio signals, the general concepts described with respect to extraction of audio features are applicable to any signal having one or more dimensions, as noted above. Thus, a simple working example of the DDA system and method described herein is implemented in an audio signal feature extractor which provides distortion-robust audio features vectors for classification, retrieval or identification tasks while addressing several primary concerns.

First, computational speed and efficiency of the signal feature extractor is enhanced by using multiple layers of OPCA. Second, the features resulting from the signal feature extractor are robust to likely distortions of the input, thereby reducing potential errors in classification, retrieval, or identification tasks using those features. In particular, the feature vectors produced as a result of the DDA are robust to likely distortions of the input, including, in many cases, distortions for which the system has not been explicitly trained. For example, with respect to a broadcast audio signal, most radio stations introduce nonlinear distortions and time compression into the audio signal before broadcasting. Other audio signal type distortions include noise from any of a number of sources, such as, for example, interference or microphone noise.

It should be noted, that as described in detail below, the DDA-based convolutional neural network can be trained on any desired distortion or noise, or any combination of distortions or noise and distortions. Third, the features are informative for the task at hand, i.e., they work well for classification, retrieval, or identification tasks with respect to a given audio input. For example, in the case of audio identification, different audio clips should map to features that are distant, in some suitable metric, so as to reduce potential false positive identifications. Again, it should be noted that the general approach, as described with respect to the extraction of features from an audio signal are fully applicable to other signal types.

Finally, in one embodiment, the feature extraction operation is designed to be computationally efficient. For example, in one embodiment, the feature extraction operation is designed such that it uses only a small fraction of the computational resources available on a typical PC.

To begin the DDA, in one embodiment, prior knowledge of distortions and noise in the signal are used to design a pre-processor to DDA. This pre-processor then uses any of a number of conventional techniques to remove those distortions or noise that can be removed using conventional algorithms. For example, in an audio signal, where equalization is a known distortion of the signal, then de-equalization is performed by the pre-processor.

The DDA then sets the parameters of the feature extractor using layered OPCA. In particular, as noted above, a system and method for noise-robust feature extraction for use in classification, retrieval, or identification of data uses a Distortion Discriminant Analysis (DDA) of a set of training signals and one or more distorted versions of that training set to define parameters of a feature extractor. The distortions applied to the training signals can be any desired distortion, or combination of distortions or noise, either natural or artificial. Note that using distorted sample input signals is less stringent and more general than requiring that a real noise model is known. Further, it should be noted that DDA does not assume that the distortion is additive: non-linear distortions are also handled. In addition, as noted above, DDA can generalize beyond the given set of distorted training signals to be robust against distortions that are not in the training set.

The feature extractor described herein then uses two or more OPCA layers for extracting low-dimensional noise-robust features from audio data. As noted above, DDA can be viewed as a multi-layer linear convolutional neural network, where the weights are trained using a modified Oriented Principal Components Analysis (OPCA) to reduce the dimensionality of the audio input and maximize a signal-to-noise ratio of its output. Two or more DDA layers are aggregated in order to enforce shift invariance, to reduce computation time, and to build in robustness to noise and distortion at different time or space scales. Feature extractors learned with DDA address each of the concerns listed above. Namely, the learned feature extractor reduces the dimensionality of the input signal; the resulting features are robust to likely distortions of the input; the features are informative for the task at hand; and finally, the feature extraction operation is computationally efficient.

Finally, in a tested embodiment of the present invention, the robustness of the DDA feature extractor is demonstrated by applying extracted features to identify known audio segments in an audio stream. Such identification is called "stream audio fingerprinting." In stream audio fingerprinting, a fixed-length segment of the incoming audio stream is converted into a low-dimensional trace (a vector). This input trace is then compared against a large set of stored, pre-computed traces, i.e., the extracted audio features, where each stored trace has previously been extracted from a particular audio segment (for example, a song). In addition, the input traces are computed at repeated intervals and compared with the database. The stored pre-computed traces are called "fingerprints," because they are used to uniquely identify particular audio segments.

Note that in one embodiment, the audio fingerprinting system described herein uses only a single fingerprint per audio clip for identification. However, in an alternate embodiment, two fingerprints are used: the initial one, and a 'confirmatory' fingerprint, right after the initial one. The use of the second fingerprint is useful for several reasons. First, the use of a second fingerprint allows a threshold for acceptance to be lowered. For example, given a lower threshold for comparison between traces, more traces are accepted for the first fingerprint, while the use of a second fingerprint provides for a more robust identification while also reducing the number of patterns which are incorrectly rejected by having a comparison threshold which is set too high with respect to the first fingerprint. In other words, the use of two fingerprints serves to reduce a false negative rate. Clearly, this embodiment is extensible to the use of even further numbers of fingerprints for trace identification, thereby further reducing identification error rates.

In addition to the just described benefits, other advantages of the signal feature extractor will become apparent from the detailed description which follows hereinafter when taken in conjunction with the accompanying drawing figures.

DESCRIPTION OF THE DRAWINGS

The specific features, aspects, and advantages of the signal feature extractor will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
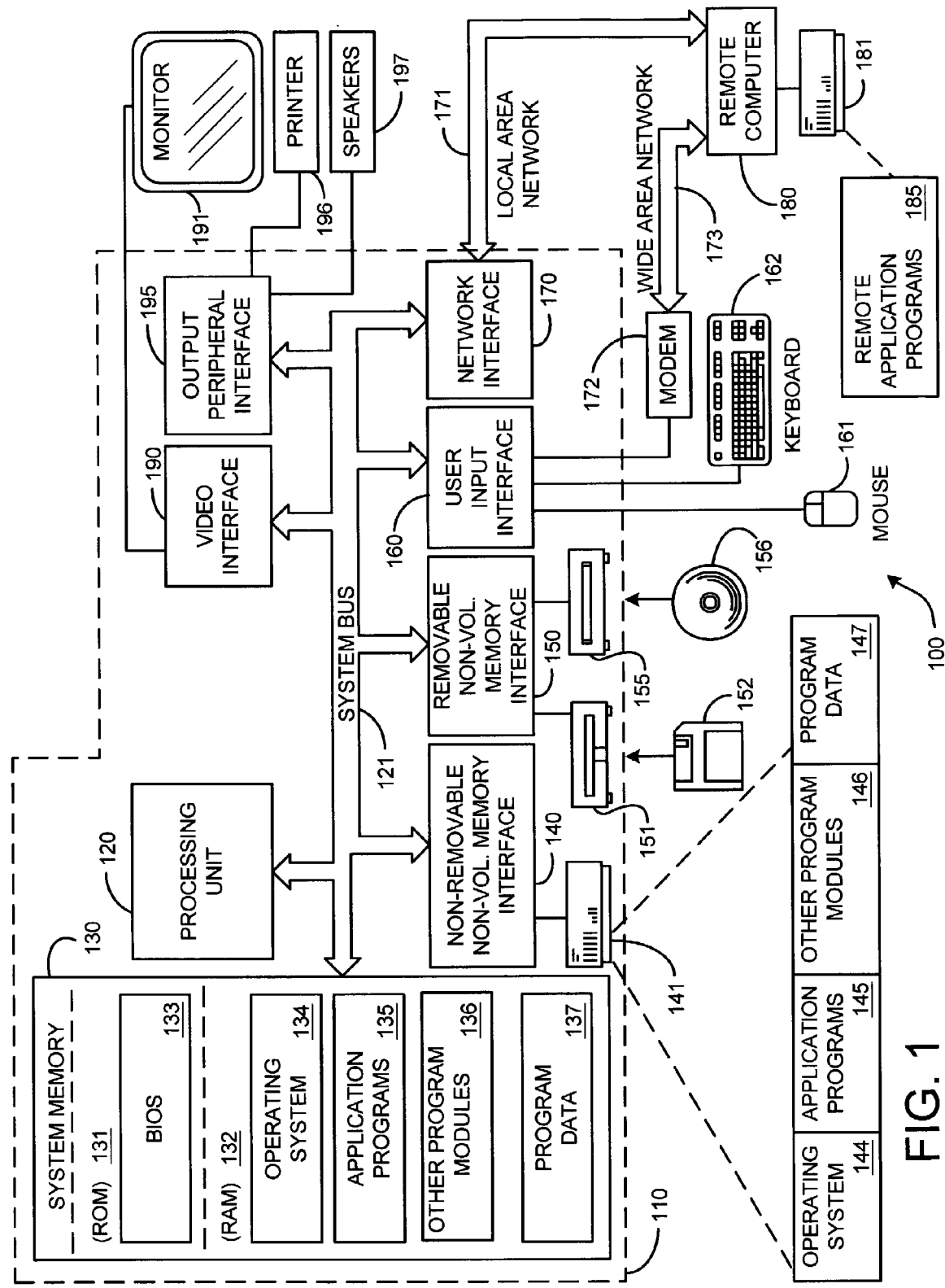
FIG. 1 is a general system diagram depicting a general-purpose computing device constituting an exemplary system for implementing a signal feature extractor.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a signal feature extractor for providing feature vectors for use in classification, retrieval, or identification of data in signals having one or more dimensions.

2.0 Introduction

Feature extraction is a necessary step for classification, retrieval, and identification tasks with respect to portions of an input signal. A system and method for extracting features from signals of one or more dimensions, such as, for example, audio signals, images, video data, or any other time or frequency domain signal, uses a "Distortion Discriminant Analysis" (DDA) of a set of training signals to define parameters of a signal feature extractor. Note that in the context of this description, a "signal" is defined to be any set of data that has a low-dimensional index set. In general, the signal feature extractor is capable of extracting features from any time, space, or frequency domain signal of one or more dimensions. For example, such signals include an audio signal which is considered to be a one-dimensional signal; an image is which considered to be a two-dimensional signal; and video data which is considered to be a three-dimensional signal. Thus, the term signal, as used throughout this description will be understood to mean a signal of any dimensionality, except where particular signal types are explicitly referred to.

In particular, the signal feature extractor described herein takes any signal with a temporal or spatial structure, applies an oriented principal component analysis (OPCA) to limited regions of the signal, aggregates the output of multiple OPCAs that are spatially or temporally adjacent, and then applies OPCA to the aggregate. The steps of aggregating adjacent OPCA outputs and applying OPCA to the aggregated values can be performed one or more times.

The use of two or more OPCA layers allows for the extraction of low-dimensional noise-robust features from a signal. Such extracted features are useful for many tasks, including, for example, automatic authentication or identification of particular signals, or particular elements within such signals. For example, with respect to an audio signal, a tested embodiment of the DDA system described herein is capable of identifying particular songs or audio clips, either individually, or as a part of a continuous or semi-continuous audio stream. Other examples regarding DDA analysis of audio data include, for example, speaker identification or differentiation, speech recognition, etc. As noted above, DDA analysis can also be performed on multi-dimensional signals, such as images or video, or any other time, space, or frequency domain signal.

In general, the signal feature extractor described herein uses DDA to provide distortion-robust feature vectors. DDA, as described below, constructs a multi-layer linear, convolutional neural network, with each layer performing an Oriented Principal Components Analysis (OPCA) for dimensional reduction of the input while also maximizing a signal-to-noise ratio of its output. In particular, two or more DDA layers are aggregated in order to enforce shift invariance, to reduce computation time, and to build in robustness to noise and distortion at different temporal or spatial scales. Note that in an alternate embodiment, as described in further detail below, the DDA system and method described herein operates to construct a non-linear convolutional neural network rather than a linear convolutional neural network.

Further, while the DDA system and method is described herein with respect to extraction of features from audio signals, the general concepts described with respect to extraction of audio features is applicable to any signal, as noted above. Thus, a simple tested embodiment of the DDA system and method described herein is implemented in an audio signal feature extractor which provides distortion-robust audio features vectors for classification, retrieval or identification tasks while addressing several primary concerns.

First, computational speed and efficiency of the signal feature extractor is enhanced by using multiple layers of Oriented Principal Component Analysis (OPCA), as described in detail below. The use of multiple layers allows for a significant reduction in a dimensionality of the input signal. For example, in the case of audio fingerprinting for an audio stream, a working example of the signal feature extractor was used to reduce the input dimensionality of the audio signal by a factor of 8000. Such a reduction using a single step of OPCA would be computationally prohibitive, both for training and for real-time feature extraction.

Second, the features resulting from the signal feature extractor are robust to likely distortions of the input, thereby reducing potential errors in classification, retrieval, or identification tasks using those features. In particular, the feature vectors produced as a result of the DDA are robust to likely distortions of the input, including, in many cases, distortions for which the system has not been explicitly trained. For example, using an audio signal for illustrative purposes, distortions can affect the audio signal for many reasons, including the fact that most radio stations introduce nonlinear distortions and time compression into the audio signal before broadcasting. Other audio-type distortions include noise from any of a number of sources, such as, for example, interference or microphone noise. It should be noted, that as described in detail below, the DDA-based convolutional neural network can be trained on any desired distortion or noise, or any combination of distortions or noise and distortions. Further, different distortions, or different combinations of distortions or noise, can be trained at each layer of the DDA-based convolutional neural network. Again, it should be noted that the general approach, as described with respect to the extraction of features from an audio signal are fully applicable to other signal types.

Third, the features are informative for the task at hand, i.e., they work well for classification, retrieval, or identification tasks with respect to a given audio input. For example, in the case of audio identification, different audio clips should map to features that are distant, in some suitable metric, so as to reduce potential false positive identifications. The use of OPCA in the layers of the DDA serves to maximize the signal variance, thereby driving the features to be as informative as possible.

Finally, in one embodiment, the feature extraction operation is designed to be computationally efficient. For example, in one embodiment, the feature extraction operation is designed such that it uses only a small fraction of the computational resources available on a typical PC.

2.1 System Overview

In general, a system and method for signal feature extraction for use in classification, retrieval, or identification of elements or segments of a data signal uses a Distortion Discriminant Analysis (DDA) of a set of training signals to defire parameters of a signal feature extractor. The signal feature extractor described herein then uses two or more OPCA layers for extracting low-dimensional noise-robust features from the data. As noted above, DDA can be viewed as a linear convolutional neural network, where the weights are trained using oriented Principal Components Analysis (OPCA) to reduce the dimensionality of the signal input. Further, each DDA layer applies OPCA to maximize a signal-to-noise ratio of its output. Two or more OPCA layers are used in order to enforce shift invariance, to reduce computation time, and to build in robustness to noise and distortion at different time scales.

To begin, in one embodiment, prior knowledge of the distortions and noise in the signal are used to design a pre-processor to DDA. This preprocessor serves to remove those distortions or noise from the signal by using any of a number of well-known conventional signal processing techniques. For example, given an audio signal, if equalization is a known distortion of the signal, then de-equalization is performed by this embodiment. Similarly, given an image input, if contrast and brightness variations are known distortions of the signal, then histogram equalization is performed by this embodiment.

Distortion Discriminant Analysis (DDA) then sets the parameters of the feature extractor using layered OPCA as described in further detail below. Feature extractors learned with DDA address each of the concerns noted above. Namely, the learned feature extractor reduces the dimensionality of the input signal; the resulting features are robust to likely distortions of the input; the features are informative for the task at hand; and finally, the feature extraction operation is computationally efficient.

DDA is trained using a set of representative training signals and one or more distorted versions of those training signals. The set of representative training signals is simply a set of data which is chosen because it is typical or generally representative of the type of data which is to be analyzed. Note that the data used for training does not have to be the same as the data that is to be analyzed. For example, there is no need to train the feature extractor using segments of the same songs which are to be passed to the feature extractor for extracting features. Furthermore, the type of training data does not have to even match the type of data expected in test phase; for example, a system trained using pop music can be used to extract features from classical music.

The distortions applied to the training signals can be any desired distortion, or combination of distortions or noise. Using distorted samples of the input signals is less stringent and more general than requiring that a real noise model is known. Further, it should be noted that DDA does not assume that the distortion is additive: non-linear distortions are also handled. As discussed below in Section 3, DDA can generalize beyond the given set of distorted training signals to be robust against distortions that are not in the training set.

Finally, in a tested embodiment the robustness of the DDA feature extractor was examined by applying extracted features to identify known audio segments in an audio stream. Audio identification enabled by this audio feature extractor is termed "stream audio fingerprinting." In stream audio fingerprinting, a fixed-length segment of the incoming audio stream is converted into a low-dimensional trace (a vector). This input trace is then compared against a large set of stored, pre-computed traces, i.e., the extracted audio features, where each stored trace has previously been extracted from a particular audio segment, such as a song, after initial training of the feature extractor using a set of training signals representative of the audio to be examined. In addition, the input traces are computed at repeated intervals and compared with the database. The pre-computed traces are called "fingerprints," because they are used to uniquely identify particular audio segments. Note that while the audio fingerprinting system described herein uses only a single fingerprint per audio clip for identification, identification error rates are further reduced in alternate embodiments by using several fingerprints per audio clip for identification.

2.2 System Architecture

Figure 2A:
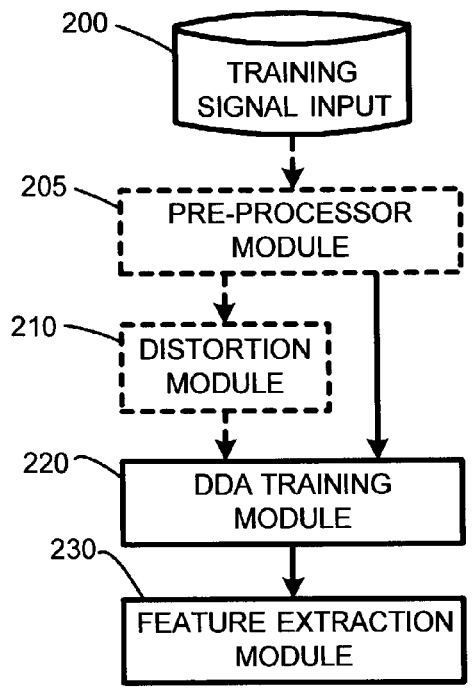
FIG. 2A illustrates an exemplary architectural diagram showing exemplary program modules for training a feature extractor for extracting features from signals having one or more dimensions.
Figure 2B:
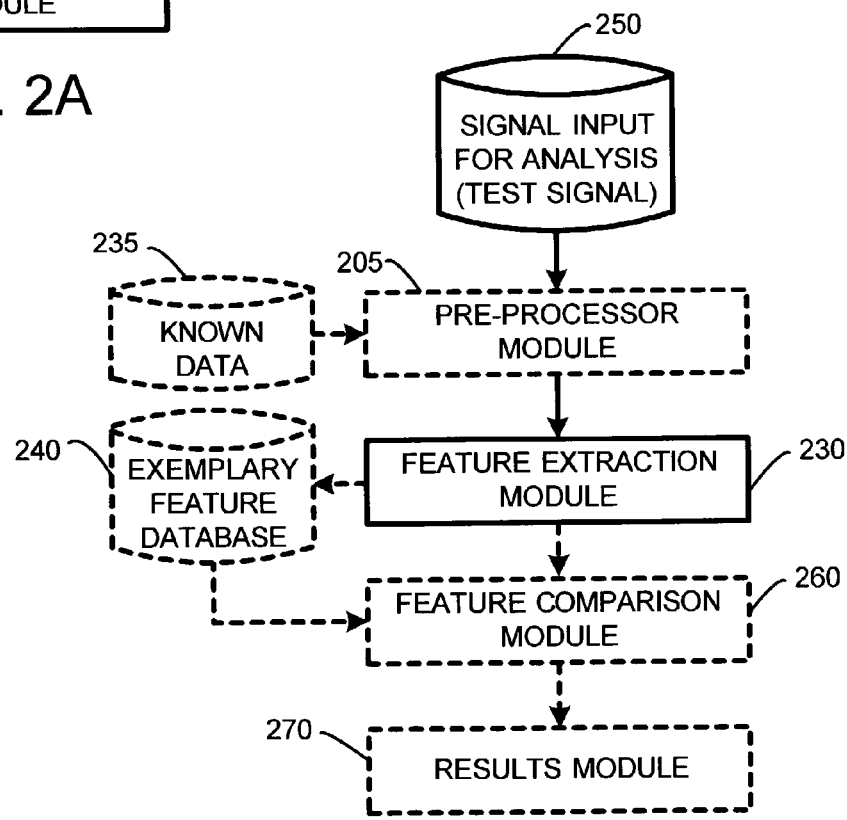
FIG. 2B illustrates an exemplary architectural diagram showing exemplary program modules for using the feature extractor of FIG. 2A for identification of signals, including creation of a feature or "fingerprint" database and comparison of fingerprints.

The process summarized above is illustrated by the general system diagrams of FIG. 2A and FIG. 2B. In particular, the system diagram of FIG. 2A illustrates the interrelationships between program modules for implementing a DDA-based feature extractor. Further, FIG. 2B illustrates alternate embodiments of the feature extractor as used in a feature analysis system. It should be noted that the boxes and interconnections between boxes that are represented by broken or dashed lines in FIG. 2A and FIG. 2B represent alternate embodiments of the invention, and that any or all of these alternate embodiments, as described below, may be used in combination with other alternate embodiments that are described throughout this document.

In particular, as illustrated by FIG. 2A, a system and method for DDA-based feature extraction begins, in one embodiment, by providing one or more training signal inputs 200 from a computer file or input device to a pre-processor module 205 for removing known distortions or noise from the training signal input 200 by using any of a number of well-known conventional signal processing techniques. For example, given an audio signal, if equalization is a known distortion of the signal, then de-equalization is performed by this embodiment. Similarly, given an image signal, if contrast and brightness variation is a known distortion of the signal, then histogram equalization is performed by this embodiment.

Next, whether or not the training input signal 200 has been pre-processed as described above, the training input signal is provided to a distortion module 210. The distortion module 210 then applies any desired distortion or noise to the training data to produce at least one distorted copy of the training signal input 200. For example, again using an audio signal for purposes of discussion, such distortions include low-pass, high-pass, band-pass, and notch filters, companders, noise effects, temporal shifts, phase shifts, compression, reverb, echo, etc. For image signals, such distortions include, for example, scaling, rotation, translation, thickening, and shear.

The distorted training signal inputs are then provided to a DDA training module 220. In addition, undistorted training data is provided directly to the DDA training module 220 either from the training signal input 200, or via the preprocessor module 205. In an alternative embodiment, distorted signals are captured directly from an input source. For example, again using an audio signal for purposes of discussion, such distorted versions of an audio input are captured directly from an input source, such as a radio broadcast. This alternative embodiment does not require use of the distortion module 210. For example, copies of a particular song or audio clip captured or recorded from several different radio or television broadcasts typically exhibit different distortion and noise characteristics for each copy, even if captured from the same station, but at different times. Thus, the different copies are typically already sufficiently distorted to allow for a distortion discriminant analysis that will produce robust features from the training data, as described in further detail below.

As noted above, the DDA training module 220 receives both distorted and undistorted copies of the training input signal 200. Finally, once the DDA training module 220 has both the undistorted training data and the distorted copies of the training data, it applies DDA to the data to derive multiple layers of OPCA projections, which are supplied to a feature extraction module 230. At this point, the feature extractor embodied in the feature extraction module 230 has been fully trained and is ready for use in extracting features from one or more input signals.

Next, as illustrated in FIG. 2B, in one embodiment, the feature extraction module 230 applies the multiple layers of OPCA projections to a set of known data 235 to produce a set of known features. For example, with respect to an audio signal comprised of songs, the known data would represent one or more known songs that when passed through the DDA trained feature extraction module 230 will produce features which then correspond to the known data 235. In one embodiment, these extracted or "learned" features are then provided to an exemplary feature database 240 for subsequent use in any of a number of classification, retrieval, and identification tasks involving a signal input 250. Note that the extraction of features from both the input signal 250 and the set of known data 235 are accomplished using an identical process. In other words, the feature extractor, once trained, extracts features from whatever signal is provided to it in the same manner.

For example, in an "audio fingerprinting system" using the feature extraction module 230, known data 235, such as, for example a number of known songs, are first passed through the DDA trained feature extraction module 230. The DDA trained feature extraction module 230 then outputs features which, in one embodiment, are stored in the exemplary feature database 240. Then, when a stream of audio is to be identified, that stream of audio is provided as the input signal 250. Again using the audio stream as the input signal 250, in one embodiment, the output of the feature extraction module 230, is then compared by a feature comparison module 260 to the features in the exemplary feature database 240 for the purpose of identifying portions or segments of the audio input signal 250 corresponding to the extracted features. In another embodiment, the results are then provided to a conventional storage or display device via a results module 270 for providing the results to a user or other computer application for further processing.

In still another embodiment, the use of a known data set is not necessary for identification tasks. In particular, using only the input signal 250, repeat instances of objects embedded in the signal, or repeat instances of particular segments or portions of the signal are located by simply storing the features extracted from the input signal, and searching through those features for locating or identifying matching features. Such matches can be located even though the identity or content of the signal corresponding to the matching features is unknown.

In still another embodiment, the feature comparison module 260 shown in FIG. 2B is used to automatically identify data that is duplicated in a large database. For example, if a large database of audio has been automatically constructed, there may exist many copies of the same piece of audio, each with a different (or no) name. In this embodiment, the feature extraction module 230 generates a fingerprint for each audio clip in the database and then uses the feature comparison module 260 to test against the rest of the database to automatically identify such duplicates, thus significantly reducing the time required to do this manually.

Note that in further embodiments, the pre-processor module 205 is used for removing known distortions or noise from both the signal input 250 and the known data 235. As described above, the distortions are removed using any of a number of well-known conventional signal processing techniques.

3.0 Operation Overview

The above-described system architecture employs a DDA training module which executes a DDA training process to train a feature extraction module for extracting features from an input signal. This process is depicted in the flow diagram of FIG. 3, as described below in Section 3.3, following a detailed operational discussion of exemplary methods for implementing the aforementioned DDA training module. Note that in this written description of the signal feature extractor, vectors are denoted in bold font and their components in normal font, while a prime denotes the transpose.

3.1 Oriented Principal Components Analysis (OPCA)

The concepts of OPCA are known to those skilled in the art. However, the form of OPCA used in the feature extractor is modified from conventional OPCA so that it is more suitable for use with the feature extractor described herein. In particular, given a set of vectors $x_i \in R_d$, i=1, . . . ,m, where each $x_i$ represents a signal, suppose that for each $x_i$ there exists a set of N distorted versions $\tilde{x}_i^k$, k=1, . . . ,N of the signal. The corresponding difference vectors are defined as $\tilde{z}_i^k \equiv \tilde{x}_i^k - x_i$ (referred to as 'noise' below). In order to maximize the signal-to-noise ratio while reducing the dimensionality of the input signal, it is necessary to find linear projections of the input signal which are in some sense as orthogonal as possible to the $\tilde{z}_i^k$ for all k, but along which the variance of the original signal $x_i$ is simultaneously maximized. The unit vectors defining the desired projections are denoted by $n_q$, q=1, . . . ,M where M is chosen by the user. For purposes of simplifying the following discussion only, set M=1, but note that M can be any desired value.

By analogy with a conventional Principal Components Analysis (PCA), a feature extractor n can be constructed which minimizes the mean squared reconstruction error $$\frac{1}{m}\sum_i (x_i - \hat{x}_i)^2$$

where $\hat{x}_i \equiv (\tilde{x} \cdot n)_1 n$. It is straightforward to show that the n that solves this problem is an eigenvector of $C_2 - C_1$, where $C_2$, $C_1$ are the correlation matrices of the $z_i$ and $x_i$ respectively.

However such a feature extractor has the unfortunate property that the direction n will change if the noise and signal vectors are globally scaled with two different scale factors. Consequently, the feature extractor described herein makes use of Oriented Principal Components Analysis (OPCA). As is known to those skilled in the art, the OPCA directions are defined as those directions n that maximize the generalized Rayleigh ratio:

$$R = \frac{n' C_1 n}{n' C_2 n} \qquad \text{Equation 1}$$

where $C_1$ is the covariance matrix of the signal and $C_2$ is the correlation matrix of the noise. In contrast to the conventional form of OPCA, the feature extractor described herein uses a correlation matrix of the noise rather than the covariance matrix of the noise in order to penalize the mean of the noise signal as well as its variance. Consider, for example, noise that has zero variance but nonzero mean: It is still desirable to find directions that are orthogonal to the mean vector. Towards this end, $C_1$ and $C_2$ are defined as follows:

$$C_1 \equiv \frac{1}{m}\sum_i (x_i - E[x])(x_i - E[x])' \qquad \text{Equation 2}$$

$$C_2 \equiv \frac{1}{mM}\sum_{i,k} z_i^k (z_i^k)' \qquad \text{Equation 3}$$

The numerator in Equation (1) is the variance of the projection of the training data along the unit vector n, while the denominator is the projected mean squared error, i.e., the mean squared modulus of all difference vectors $z_i^k$ projected along n.

The directions $n_j$ can now be found by setting $\nabla R=0$, which gives the generalized eigenvalue problem:

$$C_i n = R C_2 n \qquad \text{Equation 4}$$

3.2 Distortion Discriminant Analysis

For high dimensional data, such as audio data, OPCA can be applied in layers. For example, consider the extraction of a 64 dimensional fingerprint from 6 seconds of audio. If the audio signal is first converted to mono and downsampled to 11.025 KHz, the subsequent feature extraction must map a vector of dimension 66,150 to a vector of dimension 64. Directly solving the generalized eigenvalue problem (Equation 4) in this case is infeasible using conventional PC-type computers. Note that downsampling and conversion from multi-channel audio to single channel audio is not necessary in order to implement the audio feature extractor described herein. However, without downsampling and conversion to a single audio channel the subsequent feature extraction must map a vector having a significantly larger dimension, thereby making the problem even more computationally expensive. Again, as noted above, while the DDA system and method is described herein with respect to extraction of features from audio signals, the general concepts described with respect to extraction of audio features is applicable to any temporal or spatial signal having one or more dimensions.

In order to reduce the computational expense of solving the generalized eigenvalue problem (Equation 4), OPCA is applied in at least two layers, where the first layer operates on a log spectrum computed over a small window and the second layer operates on a vector computed by aggregating vectors produced by the first layer over time.

In particular, this layered OPCA approach can be described as follows: First, the eigenvectors computed using OPCA have a fixed dimensionality that is the same as the dimension of the frame of data used to compute them using OPCA. Following the OPCA for each frame the training signal, a number N of the top eigenvectors are then chosen for each frame. Projecting individual frames of data along these eigenvectors then produces a group of N projections for each frame. In one embodiment, each of the N projections is then is normalized. These groups of N projections are then aggregated over several frames to produce an aggregate. This aggregate is then used as a new frame that is again used to compute a new set of eigenvectors using OPCA, with the top N eigenvectors again being chosen for each frame. These steps are then repeated for as many OPCA layers as desired.

This novel approach is entitled "Distortion Discriminant Analysis" (DDA). DDA is a linear method, and the projections that occur in a given layer may be viewed as a convolution. Thus DDA may be viewed as a linear convolutional neural network, where the weights are chosen using OPCA. However, in one embodiment, as discussed in further detail in Section 3.4, DDA uses non-linear layers, to further reduce false positive and false negative rates for signal identification when matching extracted features.

In DDA, each subsequent layer sees a wider temporal or spatial window than the last, while the eigen-directions found for each particular layer are ideally suited to that particular temporal or spatial scale. This is an important feature of DDA; for example, as described below, it is used in a tested embodiment for analyzing audio signals to compensate for alignment noise. Alignment noise is defined here to be the noise resulting from the fact that a stored fingerprint can be temporally out of phase with the input traces. In the worst case, the fingerprint will have been computed from a frame which lies halfway between two frames used to compute two adjacent input traces. Compensation for such temporal distortions in a DDA system is preferably applied on the last layers, since they see the widest temporal windows.

Note that with the DDA system described herein, the feature extraction system avoids potential aliasing problems in temporal or spatial signals for the reasons described below. In particular, there is no aliasing because there are no intermediate layers having a reduced sampling rate. Consequently, both layers have the same effective sampling rate. Thus, the issue of aliasing is avoided. Note that the vector sizes of the first and subsequent layers are not fixed. In particular, so long as each layer has the same temporal (or spatial) sampling rate, in the manner described above, the issue of aliasing is avoided regardless of the number of layers used.

In one embodiment, using temporal data such as an audio signal, the DDA is trained to compensate for temporal misalignment between a stored feature extracted from the training data and an audio trace from the test data by adding an extra distortion to the training of the last layer. Such training can be accomplished simply by shifting the audio input window forward and back by some fraction of a frame, then providing this shifted audio to the DDA as one of the "distorted" versions of the training data as described above.

DDA not only makes the test phase computationally efficient, and allows the compensation of distortions at different time scales; it is also efficient in the training phase. The required covariance and correlation matrices can be computed one vector at a time. These matrices can thus be estimated using an arbitrarily large amount of data. After the matrices are estimated, the generalized eigenvalues are computed using conventional numerical linear algebra techniques which are well known to those skilled in the art.

3.3 System Operation

As noted above, the DDA module described in Section 2.0 with reference to FIG. 2A is employed to train an audio feature extractor using a convolutional neural network employing layered OPCA. Further, one possible use of the feature extractor of FIG. 2A is illustrated by the general architectural diagram of FIG. 2B. These processes are depicted in the flow diagrams of FIG. 3 and FIG. 4, respectively. It should be noted that the boxes and interconnections between boxes that are represented by broken or dashed lines in FIG. 3 and FIG. 4 represent alternate embodiments of the present invention, and that any or all of these alternate embodiments, as described below, may be used in combination.

Figure 3:
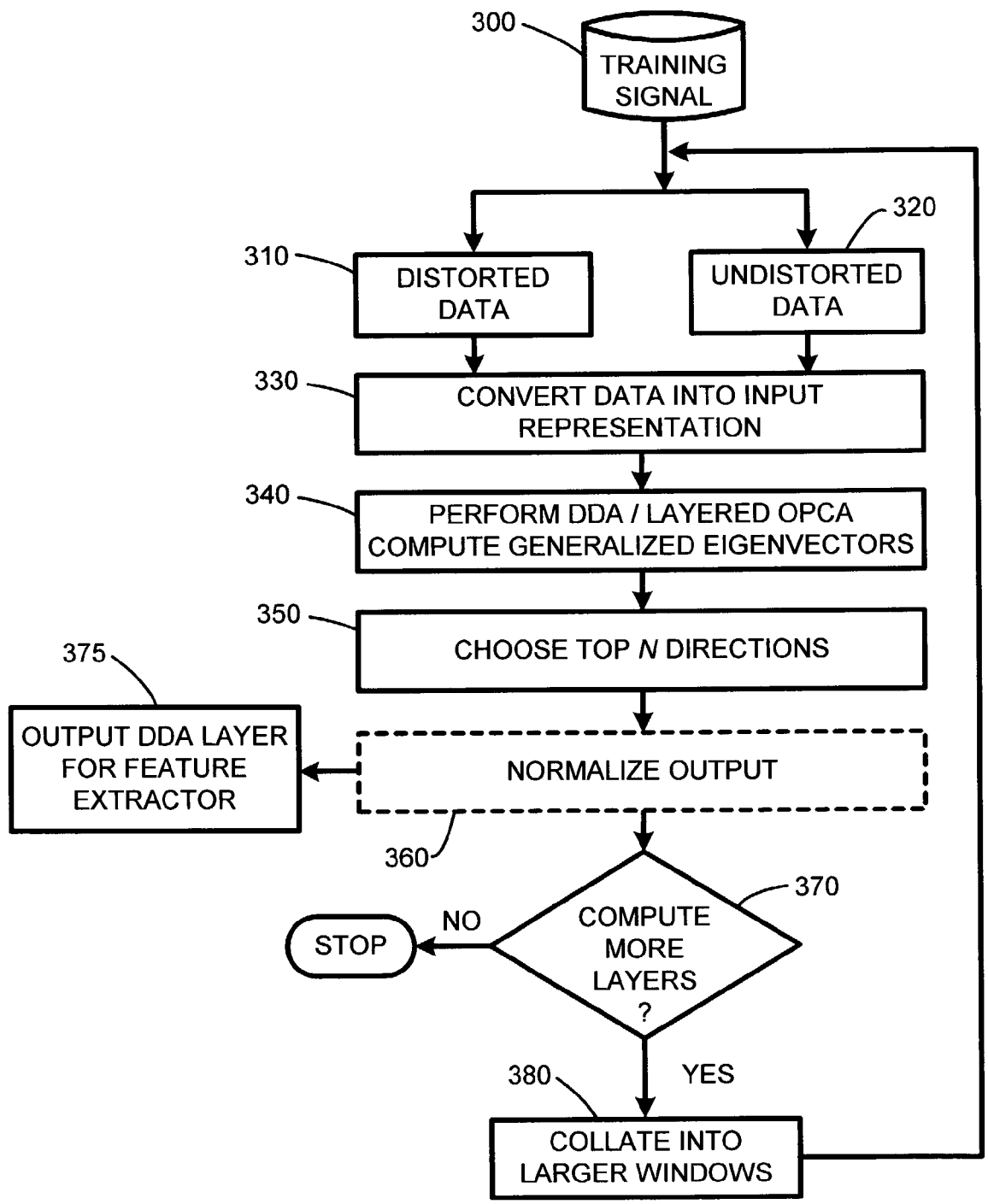
FIG. 3 illustrates an exemplary flow diagram for training a signal feature extractor to extract noise and distortion robust signal feature vectors.
Figure 4:
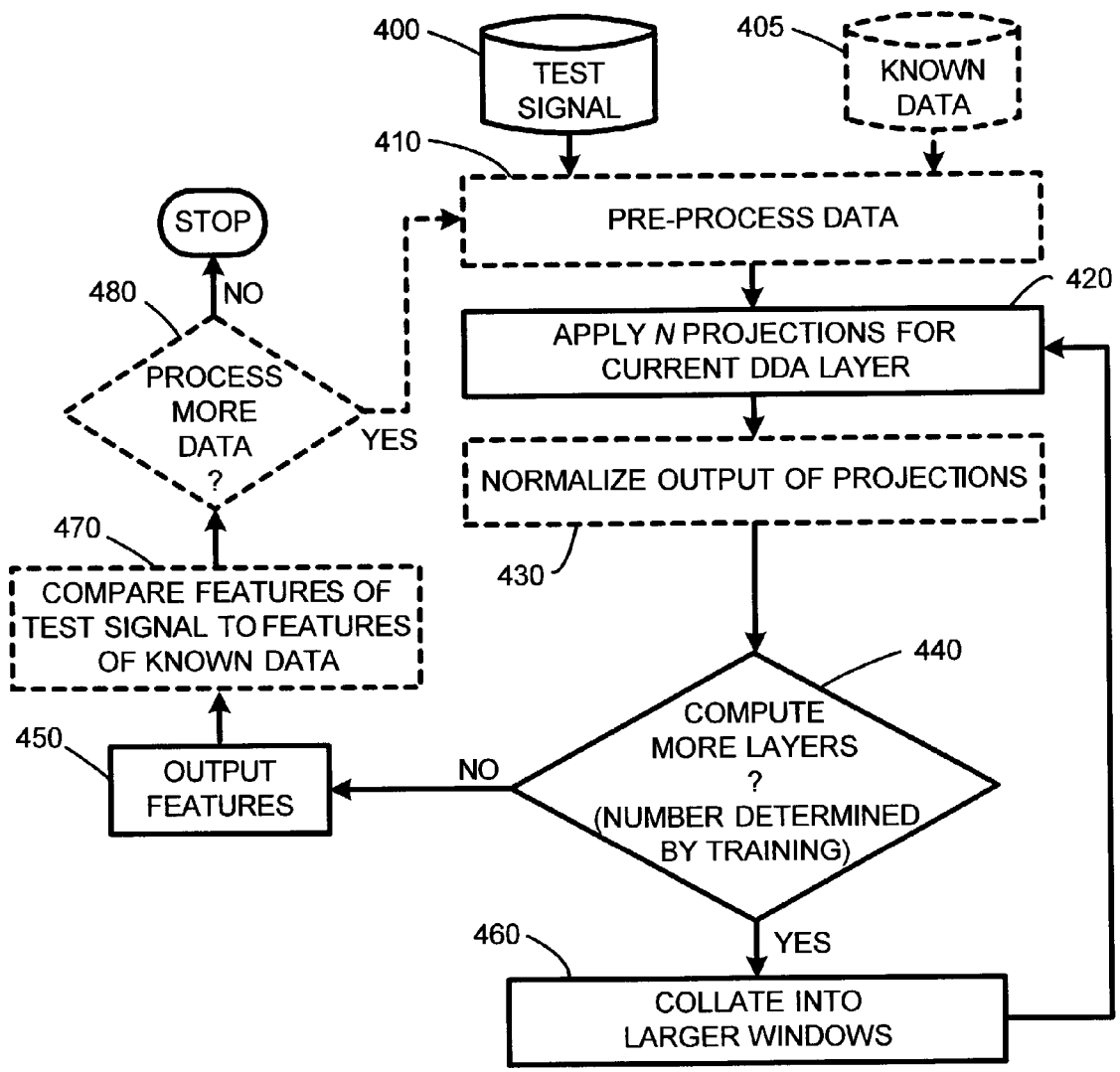
FIG. 4 illustrates an exemplary flow diagram for using extracted noise and distortion robust signal feature vectors for evaluating a signal input.

Referring now to FIG. 3 in combination with FIG. 2, the process can be generally described as system for learning noise robust features from training data for use in a signal analysis or identification system. In particular, as illustrated by FIG. 3, a feature extractor is trained for extracting features from a signal by first gathering representative training data 300. Next, in one embodiment, the training data 300 is distorted 310. Alternately, as noted above, assuming that the training data 300 is already distorted, no additional distortions are necessary. Either way, the distorted data, 310, along with copies of undistorted data 320 from the training signal 300 is then converted into a desired input representation 330. For example, conversion into a desired input representation 330 includes any of downsampling the data, converting multi-channel audio to mono audio, pre-processing the data (see Section 3.5), such as, for example to remove non-audible psychoacoustic audio components, etc. Similarly, for image signals, conversion to a desired input representation can comprise, e.g., taking overlapping fixed-sized rectangular segments from an image and representing them as vectors of pixels.

Next, a layer of distortion discriminant analysis 340 is performed on the data using the modified OPCA procedure described above. After performing the modified OPCA procedure 340 on the data, the directions or vectors with the N largest eigenvalues are chosen 350.

Next, in one embodiment, normalization parameters for the N largest eigenvalues are computed 360. In a tested embodiment, after the top N directions are applied to the training data, each direction is normalized to have zero mean over the training data and unit variance over the distorted copies of the training data. The directions 350 plus the normalization parameters computed at step 360 are then output as the parameters for the current DDA layer in the feature extractor 375.

At this point, a decision is made 370 as to whether an additional layer of DDA will be performed on the training data. Note that as discussed above, at least one additional layer of DDA is always performed, as there are a minimum of two layers of DDA. If further DDA is to be done on the data, then the normalized data is collated into larger temporal or spatial windows 380 to find features at a larger scale. Next, the training data 300 is again distorted 310, this time using new or different distortions, or alternately, more already distorted versions are simply retrieved from the training data 300, followed by the steps described above for ultimately choosing the top N directions 350, computing normalization constants 360, and then providing these parameters for the DDA layer in the feature extractor 375.

Note that on the second and subsequent iterations through the loop, step 330 includes applying all of the previous OPCA layers, in order, to the distorted training data 310 and the undistorted training data 320 until the input to the currently learned layer is computed. The steps described above are then repeated, as illustrated by FIG. 3, until such time as it is no longer desired to compute another DDA layer from the distorted training data. Note that the same number of iterations or layers used for this initial training of the feature extractor is used again for processing of any signals which are subsequently passed through the trained feature extractor.

Referring now to FIG. 4, the process continues in another embodiment by providing for analysis of signal data using the feature extractor trained as described above with reference to FIG. 3. In particular, a system for extracting features from the trained feature extractor is illustrated by the flow diagram of FIG. 4. Specifically, as illustrated by FIG. 4, the evaluation process of extracting features from a test signal 400 begins by providing the test signal 400 to be pre-processed 410. For example, with respect to pre-processing an audio signal, as described in detail in Section 3.5, pre-processing includes any of downsampling the data, converting multi-channel audio to mono audio, removing non-audible psychoacoustic audio components, etc. As noted above, preprocessing 410 is an optional step, but it serves to further reduce the dimensionality of the audio data, thereby decreasing computational requirements and improving system performance. However, if pre-processing was applied to the signal when training the feature extractor, as discussed above, then the same pre-processing 410 is repeated using the test signal 400.

Once the data has been pre-processed, projections are extracted 420 from each audio clip in the test data 400 using N projections chosen during training (see Box 350 of FIG. 3). The projections computed at this step 420 are then optionally normalized 430, using the normalization parameters computed during training of the feature extractor (see Box 360 of FIG. 3). At this point, a decision is made 440 as to whether an additional layer of DDA will be performed on the data. Note that the same number of iterations or layers used for the initial training of the feature extractor is used again for processing of any signals which are passed through the trained feature extractor. Further, the layers computed in training the feature extractor are applied in the order in which they were computed.

If no further DDA is to be done, then the normalized output of the projections 430 are output as the extracted signal features 450. However, if further DDA is to be done on the data, then the normalized projections are collated into larger spatial or temporal windows 460 to examine larger temporal or spatial windows, depending upon the signal type. Next, the collated projections are processed by the next layer of the DDA, thereby producing another set of projections, which is again optionally normalized. Further, as noted above, the same number of iterations or layers used for the initial training of the feature extractor is used again for processing of any signals which are passed through the trained feature extractor, with the layers computed in training the feature extractor being applied in the order in which they were computed. The steps described above are then repeated, as illustrated by FIG. 4, until such time as all of the layers of the DDA have been computed.

Note that for purposes of comparison to known data, a set of known data 405 is passed through the signal extractor 410 through 450 in exactly the same manner as described above for the test signal. However, given that the known data 405 is known, the features extracted are also known. Consequently, in one embodiment, the extracted features of the known data 405 are compared 470 to the extracted features of the test signal for purposes of identification.

For example, in a tested embodiment of the feature extractor, when a stream of audio is to be identified, that stream of audio is provided as the test signal 400 while a set of known audio objects, such as, for example, particular songs, is provided as the known data 405. Both the test signal 400 and the known data are passed through the feature extractor for extracting features as described above. A comparison 470 between the features of the test signal 400 and the features of the known data then serves to identify particular songs in the test signal in accordance with the preceding discussion. Note also that in one embodiment, features extracted from the test signal 400 are compared 470 against other features extracted from the test signal in order to identify or locate repeat instances of objects embedded in the signal, or repeat instances of particular portions or segments of the test signal. In a tested embodiment, comparison 470 is performed by computing a Euclidean distance between the feature of the test signal 400 and the features of the known data. If the Euclidean distance is less than a pre-determined threshold, the test signal is identified as being the same as the known data.

Finally, in another embodiment, once the final projections are computed 420 and optionally normalized 430, a determination is made 480 as to whether more test signals, or windows of a continuous or semi-continuous signal are to be processed. If so, then the processes described above are repeated for each test signal 400, or each window or segment of the test signal 400.

3.4 Non-Linear DDA Layers

As noted above, in one embodiment, DDA uses non-linear layers for audio signal feature extraction. Such use of non-linear layers serves to further reduce potential false positive and false negative rates in an audio identification or fingerprinting system using DDA derived audio features. For example, a non-linearity can be applied to each output of the first OPCA layer. The training data for the second layer must be passed through the identical non-linearity before training. An example of such a non-linearity would be a hyperbolic tangent (tanh) or a sigmoidal non-linearity, as is well known to those skilled in the art.

Another example of a non-linear layer is the use of an empirical kernel map on the output of the first OPCA layer. In such an empirical kernel map, a subset of the training set is first chosen. The output of the first OPCA layer for this subset is then computed. The empirical kernel map takes the output of the first OPCA layer for an arbitrary input and computes a kernel (distance or similarity) function between the OPCA output for the arbitrary input and the OPCA output for each member of the training subset. This map thus results in a vector whose length is equal to the size of the training subset. This vector is then presented to the second layer for temporal (or spatial) aggregation and subsequent OPCA processing. It should be noted that any of these non-linearities can be applied to the output of any of the OPCA layers in a DDA process.

3.5 Preprocessing

As noted above, in one embodiment, prior knowledge of distortions and noise in the signal are used to design a pre-processor to DDA. This preprocessor then uses any of a number of conventional techniques to remove those distortions or noise that can be removed using conventional algorithms. For example, if equalization is a known distortion of an audio signal, then de-equalization is performed by this embodiment. Similarly, given an image input, if contrast and brightness variations are known distortions of the signal, then histogram equalization is performed by this embodiment.

For example, in a tested embodiment of the feature extractor using audio data, as described above, both the training audio data, any test signal audio data, and any known audio data, (300, 400 and 405, respectively in FIG. 3 and FIG. 4) are first preprocessed to convert a stereo, or other multi-channel, audio signal to a mono audio signal. The mono audio signal is then down-sampled to 11.025 KHz. As noted above, this step is optional, and only serves to reduce computational complexity. It has been observed that overall system performance is not substantially negatively impacted by reducing the audio data in this manner.

The audio signal is then split into fixed-length frames which overlap by half. The size of the frames can be any length desired. However, in the tested embodiment of the feature extractor, window frame lengths ranging from 23.2 ms to 372 ms were observed to produce acceptable results. A modulated complex lapped transform (MCLT) is then applied to each frame. The MCLT is known in the art as a transformation of an audio signal into a time-frequency representation. Note that in alternate embodiments, other transforms, such as an FFT using any of a number of conventional windows, i.e., Hanning, Hamming, etc, can be used in place of the MCLT. Applying an FFT to windowed subsets of the audio signal also performs a transformation into a time-frequency representation. A log spectrum of the transform coefficients is then generated by taking the log modulus of each MCLT, or other transform, coefficient.

In a tested embodiment of the feature extractor, as applied to an audio signal, before applying DDA, the feature extractor described herein performs two additional pre-processing steps that suppress specific easy-to-identify distortions. The first preprocessing step removes distortion caused by frequency equalization and volume adjustment. This "de-equalization" step applies a high-pass filter (in frequency) to the log spectrum, which results in a flatter spectrum. The high-pass is performed by taking the DCT of the log spectrum, multiplying each DCT coefficient by a weight which ranges linearly from 0 for the first component to 1 for the sixth and higher components, and then performing an inverse DCT. Note that in alternate embodiments, the weights can range from 0 to 1 over longer interval than the first six components. In still further embodiments, the weighting curve is not linear. Such alternate embodiments allow the audio feature extractor to be better tailored to specific types of audio data.

The second preprocessing step removes distortions in the signal that cannot be heard by a human listener. For example, as is well known to those skilled in the art of human psychoacoustic hearing characteristics, not all sounds, frequencies, or frequency bands can be perceived by a human listener. Consequently, unperceived frequency components within an audio clip can be removed without adversely affecting the ability of the audio feature extractor to produce features for audio identification that approximate the ability of a human listener to differentiate between audio clips. Given this background, this second preprocessing step removes the distortions within the audio signal that can not be heard by exponentiating the log spectrum from the first step, then generating a frequency-dependent perceptual threshold using a conventional perceptual thresholding algorithm as described by H. S. Malvar in "Auditory masking in audio compression." In K. Greenebaum, editor, *Audio Anecdotes*. A. K. Peters Ltd., 2001. The final preprocessed signal is then the difference in dB between the log spectrum and the log perceptual threshold, if that difference is positive, and zero otherwise. Thus, imperceptible components of the spectrum are set to zero. Note that the concepts described herein with respect to signal preprocessing are also discussed in greater detail in a copending patent application entitled "IMPROVED AUDIO WATERMARK DETECTOR," filed Dec. 8, 2000, and assigned Ser. No. 09/733,576, the subject matter of which is hereby incorporated herein by this reference.

4.0 Tested Embodiment

In a simple tested embodiment of the feature extractor, the program modules described in Section 2 with reference to FIG. 2A and FIG. 2B, in view of the detailed description of DDA and the modified OPCA provided in Section 3, were employed for extracting noise and distortion robust audio features from an audio signal after training the feature extractor using a representative set of audio training data. This audio feature extractor was used to extract audio features for use in an audio fingerprinting/identification system termed "stream audio fingerprinting."

For the stream audio fingerprinting system used for demonstrating the efficacy of the audio feature extractor, the training set of the DDA system comprises 20-second audio segments, each chosen from the middle portion of 50 randomly chosen audio clips, giving a total of 16.7 minutes of audio. For every training segment, seven conventional distortions of the audio were constructed: a 3/1 compressor above 30 dB, a compander, a spline boost of the mid frequency range, a spline notch filter, a 'quick filter' emulating poor quality AM radio, and two non-linear amplitude distortions. Note that as described above, any desired distortion, or combination of distortions and noise can be used in training the audio feature extractor. In addition, the 20-second length of the training segments was chosen for convenience. It should be appreciated by those skilled in the art that either longer or shorter, or more or fewer, segments may be used. However, note that as the length of the training segment approaches zero, it becomes more difficult to extract robust features from the training data.

This training data was then used in training the feature extractor using a two layer DDA as described in detail above. Next, a number of known songs were passed through the feature extractor in the manner described above, for generating a large set of known pre-computed traces. Finally, a number of fixed-length segments of an incoming audio stream were converted into low-dimensional traces (vectors). These input traces were then compared against the large set of stored, pre-computed traces, i.e., the extracted audio features from the known data, where each stored trace has previously been extracted from a particular audio segment (for example, a song). In addition, the input traces are computed at repeated intervals or sliding windows, and compared with the set pre-computed traces of known audio objects. Note that the stored pre-computed traces are called "fingerprints," because they are used to uniquely identify particular audio segments.

Figure 5:
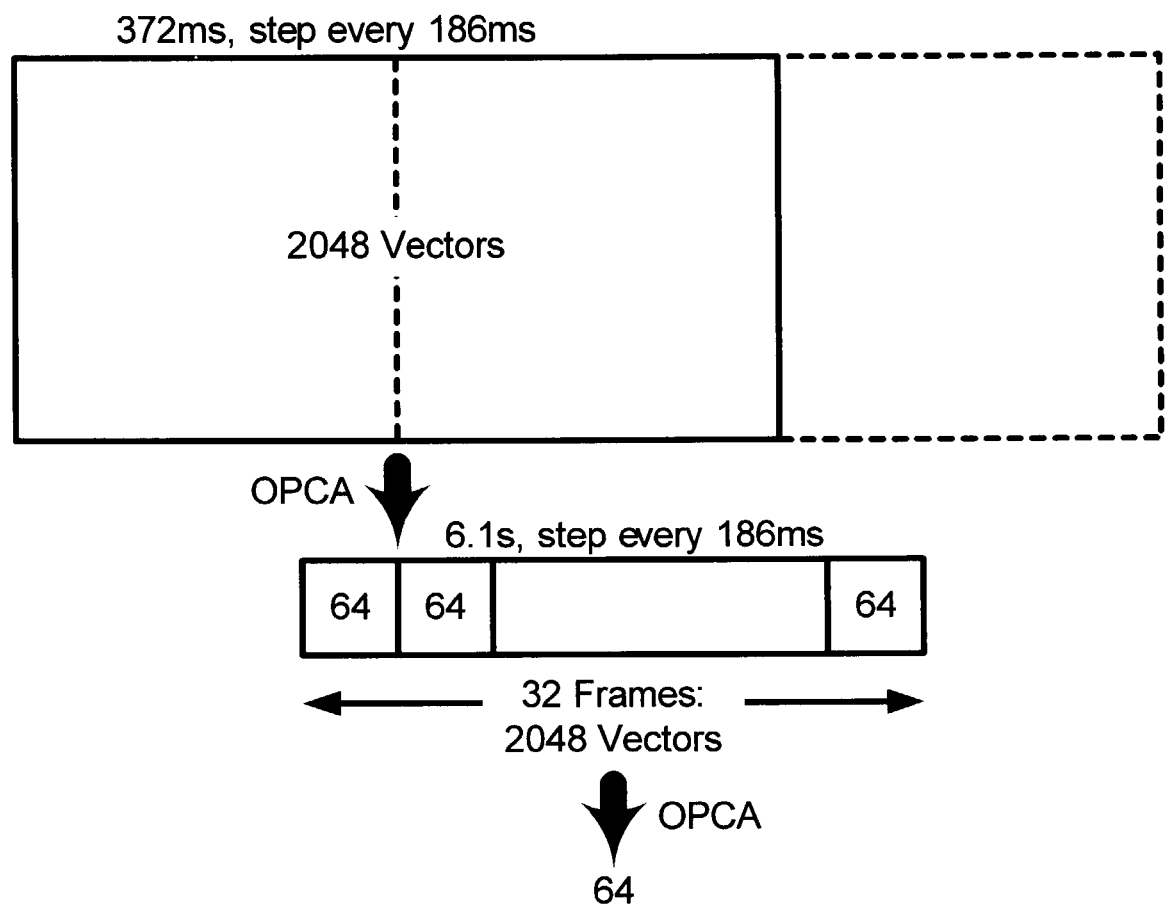
FIG. 5 is a diagram which illustrates the architecture of the DDA system, showing use of layered OPCA projections in a tested embodiment of an audio identification system employing the signal feature extractor.

Further, as noted above, the feature extraction system avoids potential aliasing problems in temporal or spatial signals for the reasons described below. In particular, there is no aliasing because there are no intermediate layers having a reduced sampling rate. For example, as illustrated by FIG. 5, in the tested embodiment of the feature extractor as applied to audio data, 2048 MCLT log magnitudes are projected to a 64 dimensional space, then 32 of the resulting frames are concatenated to form another 2048 dimensional vector, which is then projected using a second layer. Consequently, both layers have the same effective sampling rate. Thus, the issue of aliasing is avoided.

Finally, in this tested embodiment of the feature extractor, for each projection, the mean projected value of the training data, and the variance of the projected values of the (training-distorted) data, were used to normalize the projections so that they are zero mean on the training set, and so that they are unit variance on the noise. Further, in this tested embodiment of the feature extractor, the numbers output after applying the last layer are also normalized by computing scores on a validation set (which has no data in common with the training set) such that the mean distance between each training segment, and the segments in the validation set, is one. However, when it is used to compute a projection, the mean projection of the training data is first subtracted, and the resulting number divided by the standard deviation of the projections of the noise (which is the difference between training vector and distorted training vector). The result of this is that the projection of the training data has a zero mean, and the projection of the distorted versions of the training data has a unit variance. The purpose for such normalization is so that the numbers generated from different projections at a given layer can be meaningfully combined. Note that other conventional normalization techniques may also be applied in alternate embodiments.

4.1 Additional Signal Fingerprinting Embodiment

As discussed above, the signal feature extractor is generally trained using two or more OPCA layers. However, in the case of signal fingerprinting applications, the signal feature extractor is also trained, in one embodiment, using a single OPCA layer. The training of this single OPCA layer is accomplished in the same manner as described above for the first OPCA layer. Optional normalization is accomplished in the same manner as described above for the last layer of a multi-layer OPCA structure. This single layer signal feature extractor is then subsequently used to process one or more signals for extracting features from those signals. These extracted features are then compared for the purpose of identifying such signals. For example, in a signal fingerprinting system using the single-layer OPCA signal feature extractor, at least one known signal is passed through the signal feature extractor to generate a set of at least one known feature. At least one unknown signal is then passed through the signal feature extractor to generate a set of at least one unknown feature. The known and unknown features are then simply compared, in the manner described above, in order to identify one or more of the unknown signals.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for training a feature extractor for extracting features from an input signal comprising:
   receiving at least one training signal;
   receiving at least one distorted copy of the at least one training signal;
   transforming each training signal and each distorted copy of the at least one training signal into a suitable representation for taking projections;
   performing a multi-layer oriented principal component analysis (OPCA) of the at least one transformed training signal and the at least one transformed distorted copy of the at least one training signal to compute a set of training projections for each layer; and
   constructing a signal feature extractor from two or more layers of said projections.

2. The system of claim 1 wherein performing a multi-layer OPCA of the at least one transformed training signal and the at least one transformed distorted copy of the training signal to compute the set of training projections for each layer comprises;
   computing a first OPCA layer directly from the at least one transformed training signal and the at least one transformed distorted copy of the at least one training signal; and
   computing at least one subsequent OPCA layer from an aggregate of the projections from an immediately preceding OPCA layer, beginning with an aggregate of the training projections from the first OPCA layer.

3. The system of claim 1 further comprising pre-processing the at least one training signal, and the at least one distorted copy of the at least one training signal, to remove known distortions from the at least one training signal and the at least one distorted copy of the training signal.

4. The system of claim 1 further comprising normalizing the training projections output by each OPCA layer.

5. The system of claim 1 wherein the set of training projections computed for each layer is populated by a predetermined number of highest generalized eigenvalue OPCA projections computed for each layer.

6. The system of claim 1 further comprising applying a suitable normalization to each projection at each layer.

7. The system of claim 1 further comprising transforming each input signal into a representation suitable for projection.

8. The system of claim 1 wherein the at least one training signal and each distorted copy of the at least one training signal comprise audio signals and wherein transforming each training signal and each distorted copy of the at least one training signal into a suitable representation for taking projections comprises transforming the audio signals into a time-frequency representation.

9. The system of claim 8 wherein transforming the audio signals into a time-frequency representation comprises applying Fourier transforms to windowed subsets of the audio signals.

10. The system of claim 7 wherein said at least one input signal comprises an audio signal and said transforming comprises transforming the audio signal into a time-frequency representation.

11. The system of claim 7 further comprising extracting at least one feature from the at least one input signal by passing at least one transformed input signal through each layer of the feature extractor in the order in which the layers were originally computed.

12. The system of claim 2 further comprising:
receiving at least one input signal and transforming each input signal into a representation suitable for projection; and
passing at least one transformed input signal through each layer of the feature extractor in the order in which the layers were originally computed.

13. The system of claim 12 wherein passing the least one transformed input signal through each layer of the feature extractor comprises;
computing a first set of output projections by applying the training projections of the first OPCA layer to the at least one transformed input signal;
computing at least one subsequent set of output projections by applying the training projections of each layer of the feature extractor to previous aggregate layers of output projections, wherein each aggregate layer of output projections is generated by collating output projections from adjacent positions in a layer.

14. The system of claim 13 wherein a final set of output projections produced by a last layer of the feature extractor represents features extracted from the input signal.

15. The system of claim 14 wherein at least one of the input signals represent a known data signal.

16. The system of claim 15 wherein at least one of the input signals represents an unknown data signal.

17. The system of claim 16 further comprising comparing the features extracted from the known data signal to the features extracted from the unknown data signal, and wherein one or more portions of the unknown data signal are identified by the comparison of the extracted features.

18. The system of claim 1 wherein transforming each training signal and each distorted copy of the training signal into a representation suitable for projection is performed on sequential frames of the training signal, and wherein performing a multi-layer oriented principal component analysis (OPCA) of the transformed training signal and the at least one transformed distorted copy of the at least one training signal to compute a set of training projections for each layer is performed on each sequential frame of the at least one training signal.

19. The system of claim 7 wherein transforming each input signal into a representation suitable for projection is performed on sequential frames of the input signal, and wherein extracting at least one feature from the at least one input signal by passing at least one transformed input signal through each layer of the feature extractor in the order in which the layers were originally computed is performed on each sequential frame of the input signal.

20. The system of claim 1 wherein the at least one training signal and the input signal are of the same signal type, and wherein the signal type represents any of audio signals, images, and video data.

21. The system of claim 1 further comprising normalizing the training projections for each layer by computing scores on a validation signal such that a mean distance between each training projection and projections computed for the validation signal is one.

22. A method for training a feature extractor for extracting features from an input signal comprising using a computing device to:
divide at least one training signal into a set of adjacent frames, each frame having a same size;
apply a first oriented principal component analysis (OPCA) to the adjacent frames to produce a first set of generalized eigenvectors for each frame;
choose a number N of highest value eigenvectors for each frame;
project each frame along the eigenvectors computed for each frame to produce a first set of N projections for each frame;
aggregate the projections for adjacent frames to produce at least one aggregate;
apply a second OPCA to each aggregate, with the second OPCA producing a second set of generalized eigenvectors for each aggregate frame;
choose N highest value elgenvectors produced by the second OPCA for each aggregate frame;
project each aggregate frame along the eigenvectors computed for the each aggregate frame to produce a second set of N projections for each aggregate frame; and
train a feature extractor by assigning the first set of N projections to a first feature extractor layer, and assigning the second set of N projections to a second feature extractor layer.

23. The method of claim 22 wherein the at least one training signal is transformed prior to performing the OPCA.

24. The method of claim 22 further comprising normalizing the projections.

25. The method of claim 24 wherein normalizing the projections comprises normalizing the projections for the last layer by computing scores on a validation signal such that a mean distance between each projection computed from the at least one training signal and projections computed for the validation signal is one.

26. The method of claim 22 further comprising:
computing at least one subsequent layer of projections by aggregating a number of adjacent projections of an immediately preceding layer, beginning with the second set of projections to produce a subsequent aggregate frame;
applying a subsequent OPCA to this aggregate, with the OPCA outputting a new set of generalized eigenvectors;

choosing N highest value eigenvectors produced by the subsequent OPCA for each subsequent aggregate frame;

project each subsequent aggregate frame along the eigenvectors computed for the each subsequent aggregate frame to produce a subsequent set of N projections for each subsequent aggregate frame; and further training the feature extractor by assigning each new subsequent set of N projections to a subsequent feature extractor layer.

27. A computer-readable medium having computer executable instructions for extracting features from an input signal, said computer executable instructions comprising:

applying a multi-layer oriented principal component analysis (OPCA) to a set of at least one training signals for producing a set of training projections for each OPCA layer, wherein each subsequent layer of the OPCA is performed on an aggregate of outputs from an immediately preceding OPCA layer;

training a feature extractor by assigning the set of training projections for each OPCA layer to a corresponding layer of the feature extractor; and extracting features from at least one input signal by passing each input signal through each layer of the feature extractor in the order in which the layers were originally computed.

28. The computer-readable medium of claim 27 wherein applying a multi-layer OPCA to the set of training signals for producing a set of training projections for each OPCA layer comprises:

computing a first OPCA layer by:
transforming each training signal;
computing generalized eigenvectors over the transformed training signals,
projecting each training signal over a number of highest value eigenvectors to produce a number of projections from the training signal; and computing a second OPCA layer by:
collating a number of adjacent projections from the first OPCA layer into an aggregate of projections,
computing generalized eigenvectors over the aggregate of projections, and
projecting the aggregate of projections over a number of highest value eigenvectors computed from the projections to produce a number of projections from the aggregate of projections.

29. The computer-readable medium of claim 28 further comprising computing at least one additional OPCA layer by applying an OPCA to an aggregate of the projections from an immediately preceding OPCA layer, beginning with the second OPCA layer.

30. A computer-implemented process for training an audio signal feature extractor, comprising using a computing device to:

receive an audio input comprising representative audio data;

transform the audio input into a time-frequency representation;

compute generalized eigenvalues over the transformed audio data;

compute at least one eigenvector corresponding to at least one highest value eigenvalue and assign those eigenvectors to a first layer of an audio signal feature extractor;

collate a number of adjacent eigenvectors into an aggregate;

compute generalized eigenvalues over the aggregate;

compute at least one eigenvector corresponding to at least one highest value eigenvalue of the aggregate and assign those eigenvectors to a second layer of the audio feature extractor.

31. The computer-implemented process of claim 30 further comprising extracting features from at least one first audio signal by passing a time-frequency transformation of the first audio signal through each layer of the audio feature extractor.

32. The computer-implemented process of claim 30 wherein the audio input is distorted prior to transforming the audio input into a time-frequency representation.

33. The computer-implemented process of claim 30 wherein at least one copy of the audio input is distorted prior to transforming the audio data.

34. The computer-implemented process of claim 30 wherein at least one copy of the audio input is pre-processed prior to transforming the audio input by combining any multi-channel audio information into a single audio channel.

35. The computer-implemented process of claim 30 wherein the audio input is pre-processed prior to transforming the audio input by downsampling the audio input.

36. The computer-implemented process of claim 30 wherein the audio input is pre-processed prior to transforming the audio input by using a human psychoacoustic masking model for removing audio frequency components from the audio input which can not be heard by a typical human listener.

37. The computer-implemented process of claim 30 wherein the audio input is randomly shifted forward and backwards in time, Up to a predefined maximum time offset, to provide at least one temporally misaligned copy of the audio input, and wherein the feature extractor trained using the time-shifted audio data is robust against temporal misalignment.

38. The computer-implemented process of claim 30 wherein the audio input is transformed using a complex modulated lapped transform to produce the transformed audio data.

39. The computer-implemented process of claim 30 wherein the audio input is transformed using a windowed FFT to produce the transformed audio data.

40. The computer-implemented process of claim 31 wherein the first audio signal represents a known audio signal, and wherein each extracted audio feature is stored in an exemplary feature database.

41. The computer-implemented process of claim 40 further comprising extracting at least one second audio feature from at least one second audio signal.

42. The computer-implemented process of claim 41 further comprising comparing the audio features extracted from the first audio signal to the audio features extracted from the second audio signal.

* * * * *